United States Patent [19]

Divers

[11] Patent Number: 5,683,476
[45] Date of Patent: Nov. 4, 1997

[54] FLOW LINE VENTURI SCRUBBER

[75] Inventor: Edward F. Divers, Pittsburgh, Pa.

[73] Assignee: Advanced Technology Systems, Inc., Monroeville, Pa.

[21] Appl. No.: 552,674

[22] Filed: Nov. 3, 1995

[51] Int. Cl.$^6$ .................................................. B01D 47/06
[52] U.S. Cl. ................... 55/223; 55/233; 55/240; 95/211; 261/112.1; 261/DIG. 54
[58] Field of Search .................... 95/211, 210, 223, 95/217; 55/233, 223, 240; 261/98, 97, DIG. 54, 94–96, 116, 112.1

[56] References Cited

U.S. PATENT DOCUMENTS

| | | | |
|---|---|---|---|
| 3,036,417 | 5/1962 | Mare et al. | 55/233 X |
| 3,659,402 | 5/1972 | Alliger | 55/233 |
| 3,748,828 | 7/1973 | Lefebvre | 95/211 X |
| 3,763,634 | 10/1973 | Alliger | 55/233 X |
| 4,380,353 | 4/1983 | Campbell et al. | 55/233 X |
| 4,411,846 | 10/1983 | Ulrich et al. | 261/98 |
| 4,437,867 | 3/1984 | Lerner | 55/233 |
| 4,787,920 | 11/1988 | Richard | 55/233 X |
| 4,938,787 | 7/1990 | Simmerlein-Erlbacher | 55/233 |
| 5,300,131 | 4/1994 | Richard | 55/233 |

*Primary Examiner*—Richard L. Chiesa

[57] ABSTRACT

A stream of gas contaminated with particulate material is wetted by a liquid spray in a scrubber manifold. Positioned downstream of the liquid spray in the manifold is a bed of wire filaments extending transversely across the manifold and cocurrent with the liquid and gas flow through the manifold in a fan-shaped arrangement. The liquid spray impacts the filaments to fold a liquid film on the filaments. The particulate laden gas stream impacts the filaments and becomes entrained in the liquid on the filaments. The scrubbing liquid on the filament forms a particle collection surface which strips the solid contaminant particles from the gas along the filaments. The liquid and entrained particles flows by gravity down the filaments where the liquid drains with the contaminate as a film. The gas flow exits the manifold substantially free of particulate matter.

15 Claims, 4 Drawing Sheets

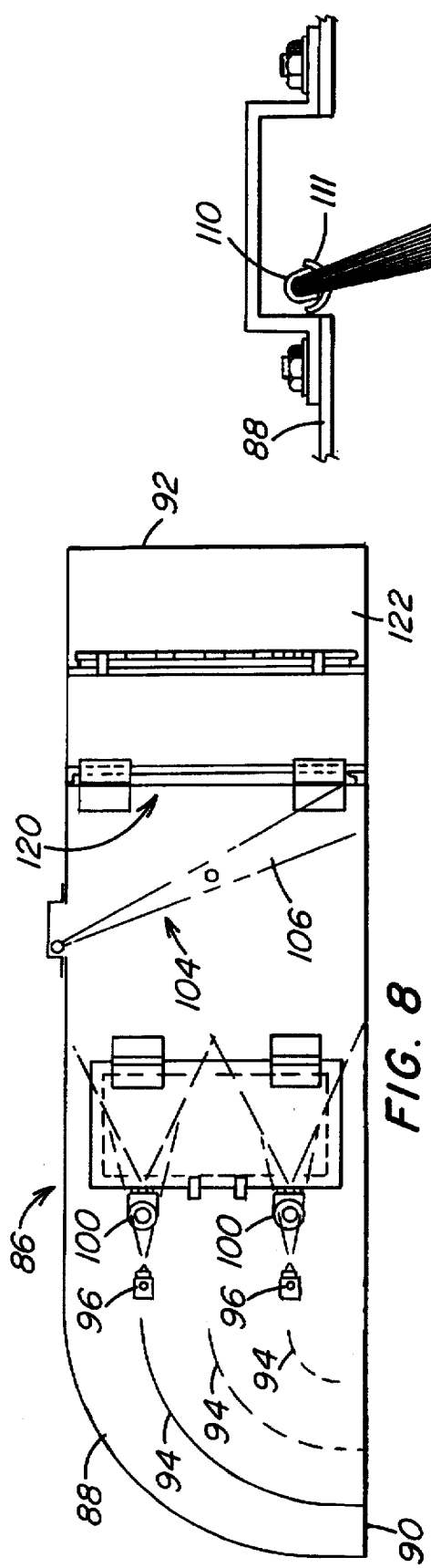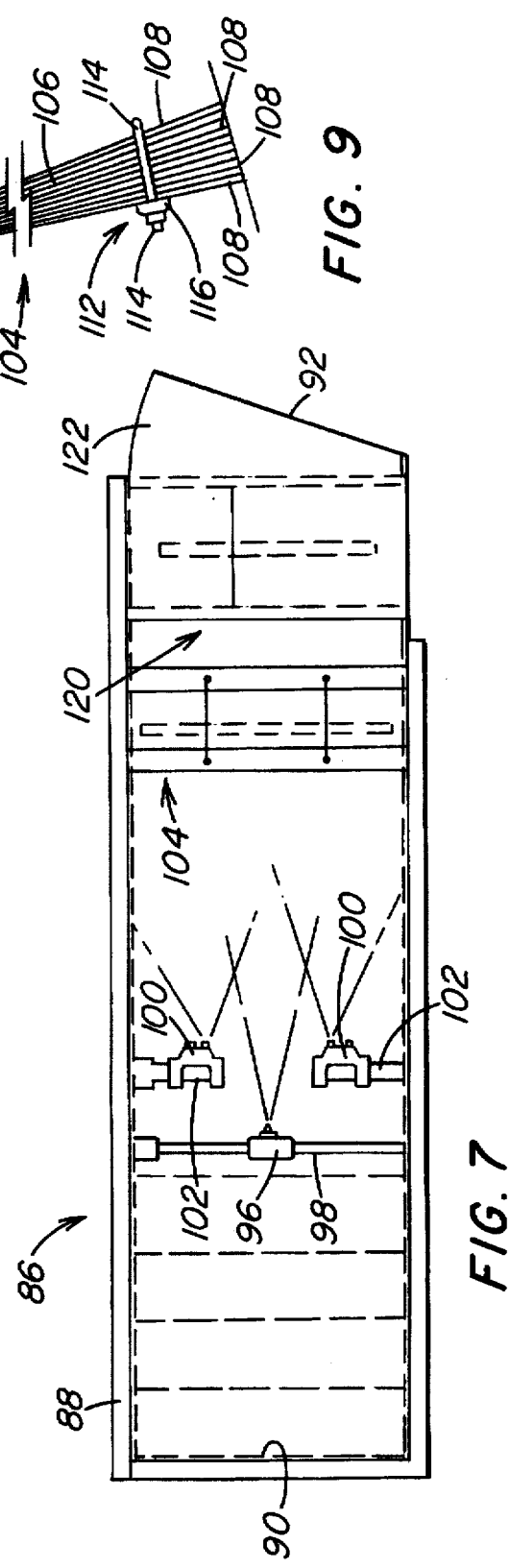

FLOW LINE VENTURI SCRUBBER

BACKGROUND OF THE INVENTION

1. Field of the Invention

This invention relates to method and apparatus for cleaning gases contaminated by airborne particulate material and more particularly to apparatus for scrubbing particulate material, such as coal dust, from an airstream with water or other scrubbing fluids.

2. Description of the Prior Art

The ventilation of coal mines requires the movement of a considerable volume of air to and from the working environment. The circulating air carries with it coal dust, rock dust, and other particulate materials which are by-products of the mining operation. The air removed has to be replaced by air which should be relatively free from such contaminants.

It is common practice to scrub the exhaust air with water and/or other liquids to remove the undesired particles therefrom. A number of scrubber devices have been developed to remove the particles from the dust laden air. One type of scrubber is the gas atomized spray scrubber or venturi scrubber in which the airstream and scrubbing liquid are intimately moved in a cocurrent stream at the venturi throat. The solid contaminants are separated from the gas by entrainment in the liquid. The particles are then exhausted with the scrubbing liquid to an entrainment separator.

Another type of scrubber that forces the contaminated air and scrubbing liquid through a bed of fibrous material is known as fibrous packing. Solid particles are extracted by inertial impaction from the scrubbing liquid on a fibrous bed. The fibrous bed type scrubber is highly efficient but has the disadvantage of clogging during use. Clogging does not generally occur in the venturi scrubber.

SUMMARY OF THE INVENTION

The present invention combines the advantages of both types of scrubbers above-mentioned, but is free from their disadvantages. With the present invention a combined stream of gas contaminated with particulate material is wetted by a liquid spray and caused to travel through a field of individual filaments or strands extending in the direction of travel. The filaments are preferably bunched and supported at their upstream ends and fan out downstream across the area covered by the gas stream. The liquid spray impacts the filaments and forms a liquid film on the filaments. The particulate laden gas stream impacts the filaments and becomes entrained in the liquid on the filaments. The scrubbing liquid on the filaments forms a particle collection surface which strips the solid contaminant particles from the gas along said filaments and drips off the filaments at their downstream ends where the liquid entrained with the particles is collected.

The duct in which the gas stream is confined is preferably of venturi shape with its filaments at the venturi throat. The throat contour is adjustable as desired. The filaments are supported at their upstream ends in rows from traverse members spanning the duct throat, or in other configurations. The filaments in adjoining rows cross over each other.

Accordingly, a principal object of the present invention is to provide a flow line venturi scrubber having a higher particulate collection efficiency than conventional venturi scrubbers which require mechanical fans to generate air flow through the scrubbers.

Another object of the present invention is to provide a water powered scrubber for use in coal mines with a selected piece of equipment, e.g. stageloader, crusher, belt drive housing, and the like, for scrubbing dust of respirable size and larger in which pressurized water and/or air provide air flow thru momentum transfer.

A further object of the present invention is to provide a flow line venturi scrubber having a plurality of wetted wire strands extending cocurrent to the direction of air flow and providing a small diameter target for particulate impaction and the particles entrained in the liquid film on the strands are continuously washed from the strands.

These and other objects of the present invention are set forth in greater detail in the following specifications, accompanying drawings, and appended claims.

BRIEF DESCRIPTION OF THE DRAWINGS

FIG. 7 is a plan view similar to FIG. 2 of a further embodiment of a water powered dust scrubber in accordance with the present invention.

FIG. 8 is a side elevation view of the scrubber shown in FIG. 7.

FIG. 9 is a sectional view taken along the IX—IX of FIG. 7.

DESCRIPTION OF THE PREFERRED EMBODIMENTS

Figure 1:
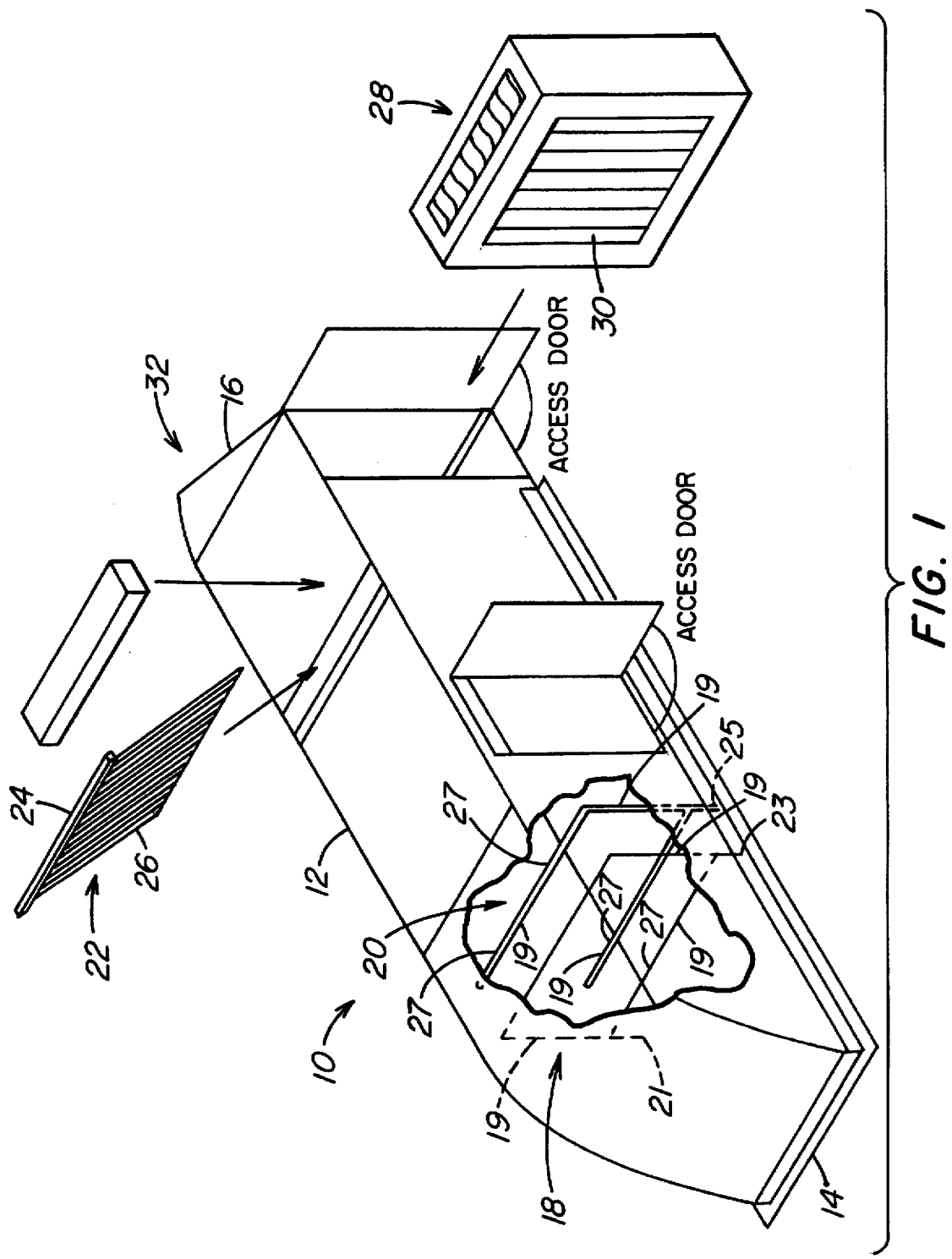
FIG. 1 is an isometric exploded view of one embodiment of the flow line venturi scrubber of the present invention.

Referring to the drawings and particularly to FIG. 1 there is illustrated a water powered scrubber generally designated by the numeral 10 having a manifold 12 with an inlet 14 and outlet 16. The scrubber is adaptable for use in any environment for removing particulate matter from dust laden air, such as in a coal mine. The scrubber 10 is designed for mounting on a selected piece of equipment, such as a continuous mining machine, stageloader, crusher, belt drive housing, and the like used in an underground mining operation.

Adjacent to the scrubber 14 is positioned an atomizing spray assembly generally designated by the numeral 18 and a prime air moving spray assembly 20. For example, the spray assembly 18 generates a liquid spray, for example, at a pressure of 100 p.s.i. and a flow rate of 16 g.p.m. The air spray assembly 20 generates an air flow of 100 p.s.i. and 20 c.f.m. Particulate laden air is induced to flow through the manifold 12 from the inlet 14 to the outlet 16 by a two-stage water and air process.

The atomizing spray assembly 18 and the prime air moving spray assembly 20 are constructed of tubular members 19 eventually coupled together. An air connection is provided at tubular end portion 21 and water connections are provided at tubular end portions 23 and 25. The air and water connections include a conventional pressure—regulatory valve (not shown) to generate a uniform flow, as well as, provide the system with an on-off control. Preferably suitable regulating devices (not shown) are used to limit the air and water pressure to less than 400 p.s.i. With this arrangement an atomized liquid spray is directed from a plurality of nozzles 27 connected to the tubular members 19. The spray from the nozzle 27 is directed cocurrent with the dust particle laden air stream through the manifold 12. The dust laden air stream is accelerated by the atomized air and water spray through the manifold 12.

Positioned downstream of the assemblies 18 and 20 in the manifold 12 is a particle collection mechanism generally designate by the numeral 22. Separation and collection of the dust particles from the air stream by the mechanism 22 is accomplished by inertial impaction of the particles with bed 24 of wetted wire strands or filaments 26. The atomized spray from assemblies 18 and 20 entrained with dust particles impacts the bed 24 of wire strands 26 and forms a liquid film on the strands 26. Each wetted strand 26 provides a small diameter target for particulate impaction.

The dust particles in the air stream flowing through the manifold 12 impact the wetted strands 26 to collect the dust particles and separate them from the air stream by inertial impaction. The dust particles while in contact with the wire strands 26 become entrained in the liquid film on strands 26. Thus the liquid film on the strands 26 forms a dust particulate collection surface.

The bed 24 of wire strands 26 extends longitudinally in the manifold 12 cocurrent with the air flow. The dust particles contact the wire surfaces and are entrained in the liquid film. The dust entrained liquid flows continuously by gravity from the strands 26. In this manner the dust particles are stripped from the strands 26 as the liquid flows off the strands 26. This stripping action is continuous so that the collected particles do not build up on the surface of the bed 24 and clog the scrubber 10. The stripping action of the dust laden liquid takes place along the length of each wire strand 26. The dust laden liquid flows from the end of each wire strand into a collection device (not shown) mounted to the manifold 12 below the bed 24.

Downstream of the bed 24 in the manifold 12 is positioned a demister assembly generally designed by the numeral 28. The demister 28 is conventional in design and includes a movable assembly of blades 30 angularly positioned with respect to the flow of air through the manifold 12. The blades 30 serve to remove the mist from the air flow so that when the air flow exits the manifold outlet 16 it is substantially free of liquid. The mist eliminator 28 removes from the air stream liquid droplets of a preselected diameter. Preferably the manifold outlet 16 includes a vane assembly 32 that is adjustable to direct the exiting air flow in a preselected direction from the manifold 12.

Figure 2:
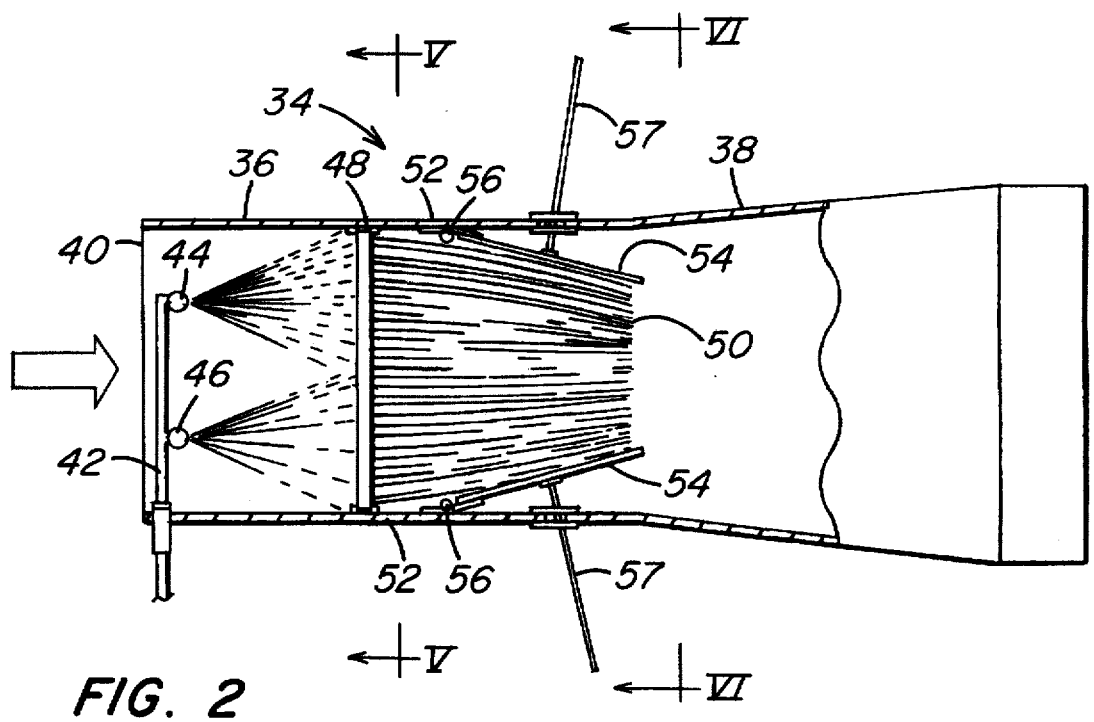
FIG. 2 is a view of side elevation, partially in section, of another embodiment of scrubber apparatus, illustrating a duct with variable throat opening and a bed of wire filaments mounted cocurrent to the direction of fluid flow.
Figure 3:
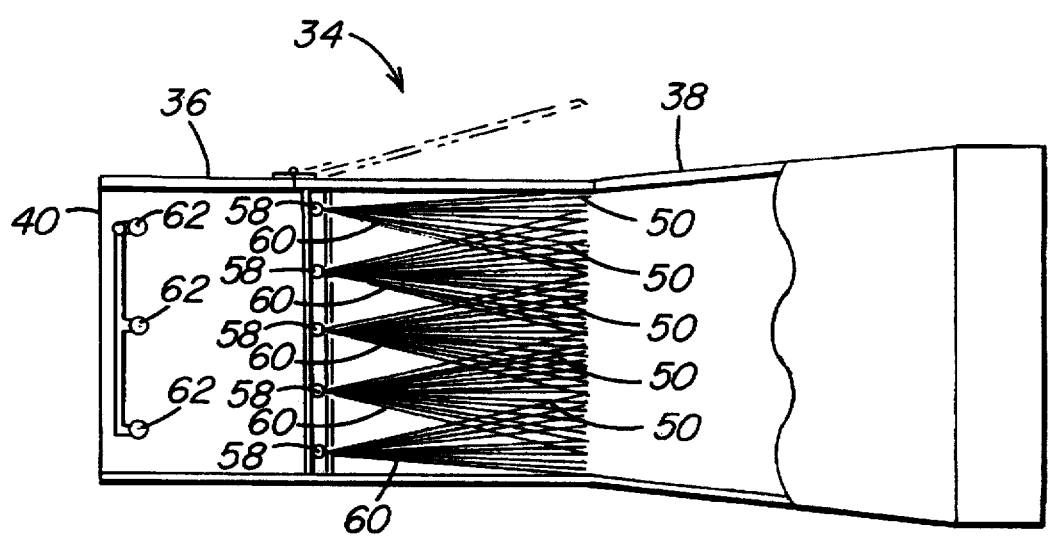
FIG. 3 is a top plane sectional view of the scrubber apparatus shown in FIG. 2, illustrating a plurality of wire beds movably retained in rows in the duct to adjust the density of the beds.

Now referring to FIGS. 2 and 3 there is illustrated another embodiment of a water powered scrubber generally designated by the numeral 34 having a throat section 36 and an expanding delivery section 38. The dust laden air is introduced into the scrubber 34 at inlet 40. A liquid spray pipe 42 carries two spray nozzles 44 and 46 in transverse relation at the throat section 36. Downstream from spray nozzles 44 and 46 is positioned a cross member 48. A field of strands or filaments 50 are affixed to the cross member 48 whereby each filament is fastened at one end and extends downstream from cross member 48. The filaments 50 are preferably crimped stainless steel wires between about 0.0035 and 0.010 inches in diameter and between about 4 to 24 inches long.

The throat section 36 is preferably rectangularly formed by opposed side walls 52 and provided with plurality of the spray pipes 42 with spray nozzles 44 and 46 mounted thereon, one above the other, as well as several cross members 48 carrying groups of filaments 50 one above the other.

The throat section 36 forms a venturi section having internal oppositely positioned side panels 54 attached by hinges 56 to the throat side and extending downstream from the hinges 56. As shown in FIG. 2, the side panels 54 are positioned to direct the field of filaments 50 converging downstream. The side panels 54 are adjustable externally of the scrubber 34 by arms 56 which extend through the side wall 52. In FIG. 3 there is illustrated five vertical cross members 58 each carrying a field 60 of filaments 50 by their upstream ends. With this arrangement the filaments 50 overlap each other downstream from the cross members 58. The spray nozzles 62 are positioned upstream of the cross members 58.

Figure 4:
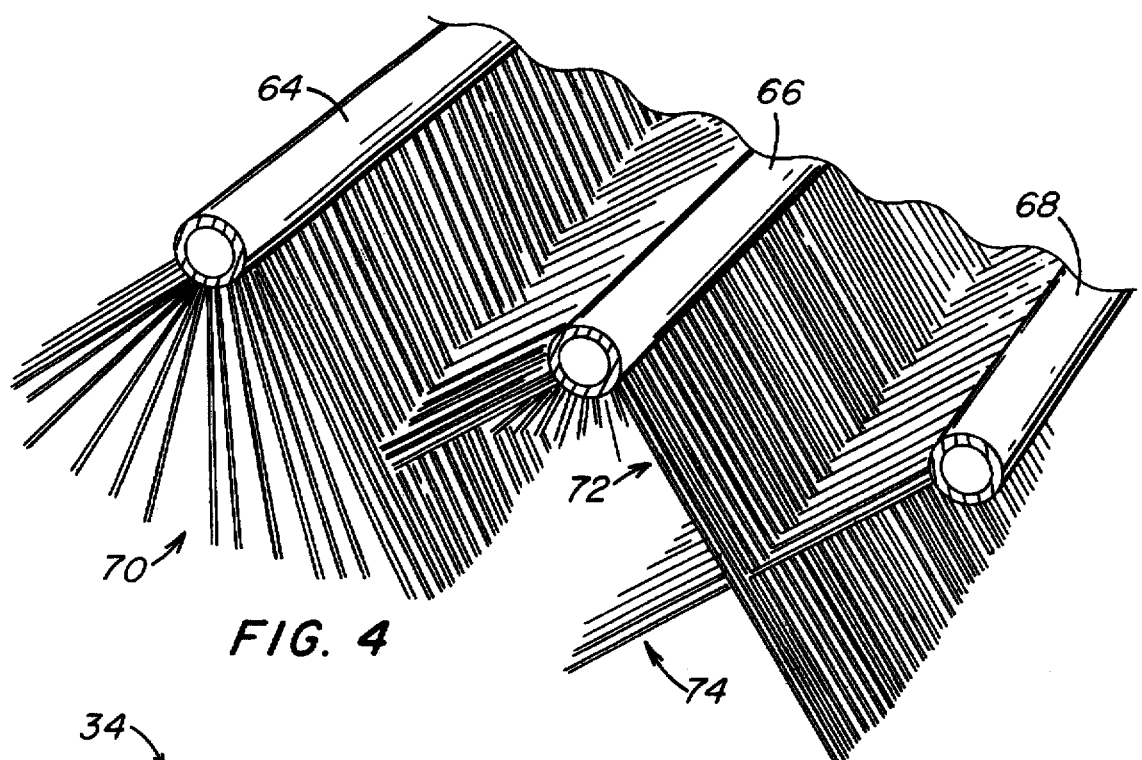
FIG. 4 is an enlarged fragmentary isometric view of some of the wire rows forming the wire bed, illustrating the intersecting relationship of wire in adjacent rows.

Now referring to FIG. 4 they are showing in greater detail cross members 64, 66, and 68 which correspond to horizontal cross members 48 or vertical cross members 58 described above. Each of the cross members 64–68 carry a fan-shaped field of filaments 70, 72, and 74 respectively. The field of filaments 70–74 cross the fields of adjoining filaments as shown downstream of their respective cross members.

Figure 5:
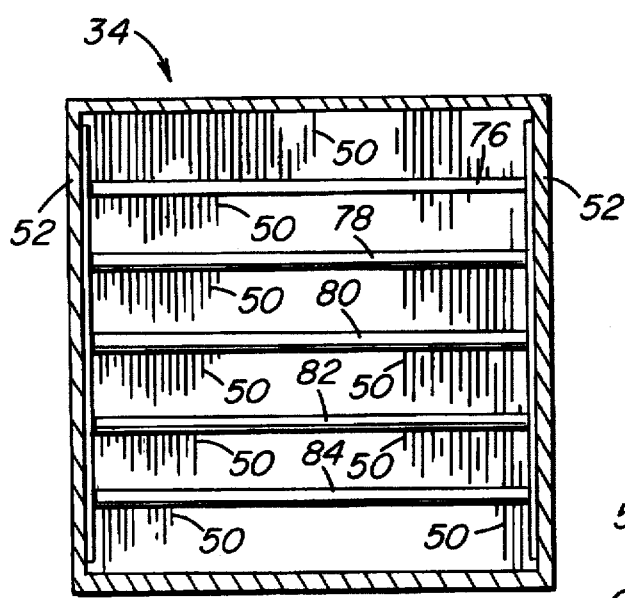
FIG. 5 is a sectional view of the duct taken along line V—V of FIG. 2, illustrating the mounting of the retaining rods for the rows of wire in the duct.
Figure 6:
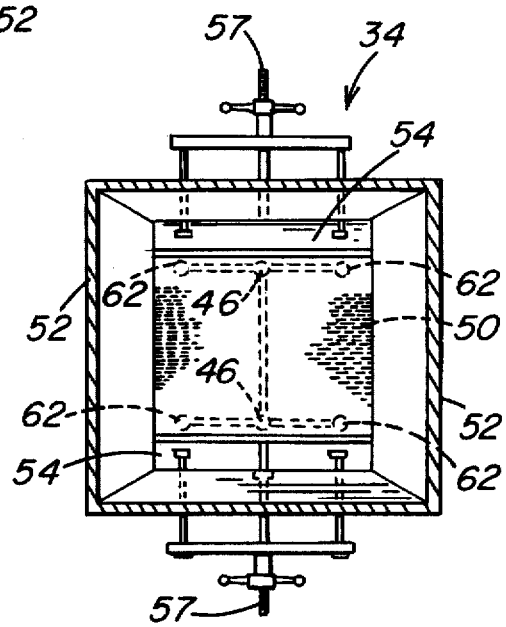
FIG. 6 is a sectional view of the duct taken along line VI—VI of FIG. 2, illustrating the mechanism for adjusting the density of the bed of wire filaments in the duct.

As shown in FIG. 5 there is illustrated a downstream elevation of five horizontal cross members 76, 78, 80, 82, and 84 each carrying a fan-shaped field of filaments 50 extending downstream therefrom as shown in FIG. 4. It should be understood that other arrangements of cross members and filaments may be utilized to construct the desired field of filaments in the path of the dust laden air entrained in the liquid spray.

Preferably the downstream filament ends and adjoining portions of the filaments 50 spread over as much of the cross section of the duct work forming the scrubber 34 as possible. This arrangement is particularly effective with bunching groups of filaments where the maximum number of bunched filament downstream ends in those portions of the duct having the maximum flow of dust laden air.

Each of the wetted wire strands provides a small diameter target for particulate impaction. The particulate matter impacts the filaments and becomes entrained in the liquid on the filaments. The dust particles impact the filaments which are covered with liquid. The particles become entrained with the liquid and are washed or scrubbed from the wire filaments. As the scrubbing action takes place along the filaments the liquid with the extracted contaminants is stripped from the filaments as the particle ladened liquid flows by gravity along the length of the wire filaments and drains from the ends of the filaments.

Referring to FIGS. 7 and 8 there is illustrated an additional embodiment of the present invention that includes the water powered scrubber generally designated by the numeral 86 having a manifold 88 with an inlet 90 and an outlet 92. The inlet 90 includes a plurality of parallel spaced, arcuately shaped panels 94 that extend from the inlet 90 into the manifold 88. The panels 94 are segmented to operate as splitters for the incoming flow of particle laden air into the manifold 88.

Within the manifold 99 at the end of the panels 94 are positioned a first bank of liquid spray nozzles 96 that cast a water spray downstream of the inlet 90 in a direction cocurrent with the air flow through the manifold 88. The nozzle 96 are connected to conventional piping 98 that supply the nozzles 96 with a regulated flow of water and air. The water/air spray from the nozzle 96 induces flow of the dust laden air through the manifold 88.

Downstream of the first bank of nozzles 96 in the manifold 88 is positioned a second bank of nozzles 100 that generate an atomized spray of liquid cocurrent with the air flow through the manifold 88. The nozzle 100 are also connected to piping or conduit 102 that supply a combined flow of liquid and air to the nozzle 100. Then the combined atomized spray from nozzles 96 and 100 create an accelerated stream of liquid droplets that entrain the contaminant particles in the airstream flowing through the manifold 88.

Positioned further downstream of the bank of nozzles 96 and 100 in the manifold 88 is an impact assembly 104 shown in greater detail in FIG. 9. The impact assembly 104 corresponds to the particle collection mechanism 22 described above and illustrated in FIG. 1. The impact assembly 104 includes bed 106 of wire strands or filaments 108. The filaments 108 are wetted by the atomized liquid spray from the nozzles 96 and 100. The atomized spray impacts the bed 106 of wire filaments 108 and forms a liquid film on the filaments 108. With this arrangement each wetted filament 108 provides a small diameter target for impaction of the particles of the dust laden stream impacting the bed 106.

The bed 106 of wire filaments 108 extend transversely across the manifold 88 at an angle as shown in FIGS. 8 and 9, extending toward the manifold outlet 92 and cocurrent with the air flow. In the embodiment shown in FIG. 9 the upper ends of the filaments 108 are received within a cap 110 that is secured to and extends transversely across the manifold 88. The cap 110 is connected to a plurality of half pipe sections 112 that are welded to the walls of the manifold 88 beneath the cap 110. The cap 110 include openings through which the filaments 108 extend. With this arrangement the combination of the cap 110 and pipe sections 112 form a series of pockets across the manifold 88 to hold the bed 106 of wire filaments 108 in place.

The density of the bed 106 of wire filaments 108 is controllable to provide the desired impact surface for separation of the dust particles from the air stream flowing through the manifold 88. The density is adjustable by provision of a clamp assembly generally designated by the numeral 112 in FIG. 9. The clamp assembly 112 includes a U-shaped bar 114 that extends across the entire filament bed 106. The opposite ends of the U-shaped bar 114 are received within eyelets at the ends of a rod 116. The threaded ends of the bar 114 are secured by nuts 118 to the rod 116. Thus tightening the nuts 118. On the bar 114 compresses the filaments 108 to make the bed 106 more dense.

The dust particles in the air stream contact the wire filaments 108. The dust particles become entrained in the liquid from the atomized sprays on the filaments so that the liquid on the filaments becomes a collecting or mass transfer surface for the dust particles. The collection from the inertial impaction of the dust particles with the liquid on the filaments 108 is cocurrent with the air flow. The liquid on the filaments 108 flows by gravity the length of the filaments. This flow is also cocurrent with the air flow. The dust particles are entrained in the liquid on the filaments 108 and flow with the liquid from the ends of the filaments 108. The dust particles entrained in the liquid drains from the filaments as a film.

As with the embodiment of the scrubber 10 shown in FIG. 1, the scrubber 86 includes a mist eliminator generally designated by the numeral 120. The mist eliminator removes liquid droplets of a preselected diameter from the air stream. Downstream of the mist eliminator 120 at the manifold outlet 92 is a reversible turning vane 122. The vane 122 is adjustably positioned in the outlet 92 to deflect the air flow in a desired direction from the manifold outlet 92. The air flow from the outlet 92 is substantially free of particulate contaminants in accordance with the present invention.

I claim:

1. Apparatus for cleaning gas contaminated by airborne particulate matter comprising, a chamber having an inlet at one end and an outlet at an opposite end forming passageway for the flow therethrough of the gas to be cleaned, a plurality of elongated wire strands forming impact members positioned in said chamber passageway between said inlet and said outlet, support member mounted in said passageway for suspending said wire strands to extend longitudinally from upper fixed ends to lower free ends in the flow path of the gas in said passageway, ejector means for introducing a pressurized spray of liquid into said passageway to apply a liquid film to the surface of said wire strands, means for accelerating the flow of the contaminated gas through said passageway to pass in contact with said wire strands for entrainment of the particulate matter in the liquid film on said wire strands to remove the particulate matter from the gas, and collecting means for directing the liquid with entrained particulate matter to flow on the surface of said wire strands to a location where the entrained particulate matter drains from said wire strands as a film out of the passageway with the gas passing from said passageway outlet substantially free of particulate matter.

2. Apparatus as set forth in claim 1 which includes, a venturi section positioned in said chamber between said inlet and said outlet, and said venturi section having a cross-sectional area less than the cross-sectional area of said chamber of said outlet to accelerate the flow of gas and pressurized spray of liquid through said passageway.

3. Apparatus as set forth in claim 2 in which, said support means is positioned in said chamber at said venturi section, and said wire strands each including a fixed end portion connecting to said support means and extending through said venturi section to a free end portion.

4. Apparatus as set forth in claim 3 which includes, said wire strands extending longitudinally in said chamber with said strand free end portions bunched together in intersecting relationship to fill the cross-sectional area of said venturi-section requiring the entire flow of the contaminated gas to pass through said bunched together wire strands.

5. Apparatus as set forth in claim 3 in which, said collecting means includes said strand free end portion positioned downstream of said ejector means in the flow path of the gas, and said strands having an extended surface to receive the flow of gas and strip the particulate matter from the gas by entrainment in the liquid film on said strands and movement of the particulate matter entrained in the liquid along said strands for discharge from said strand free end portions.

6. Apparatus as set forth in claim 1 which includes, said wire strands having free end portions intersecting with one another to form a dense field of wire strands filling said passageway of said chamber, and said field of wire strands providing an impact surface to receive gas as the gas passes through said chamber.

7. Apparatus as set forth in claim 6 which includes, means for adjusting the density of the field of wire strands to increase the surface contact with said wires of the gas flowing through said field of wire strands.

8. Apparatus as set forth in claim 1 in which, said ejector means includes a plurality of nozzles connected to a source of liquid and positioned in said chamber upstream of said wire strands, and said nozzles directing a spray of liquid co-current with the flow of gas through said passageway onto the surface of said wire strands to cover said wire strands with a liquid film.

9. Apparatus as set forth in claim 1 which includes, a field of wire strands extending the width of said passageway, said field being formed of a plurality of components, each of said components including a group of said wire strands extending from said support member in a fan pattern in the direction of gas flow through said passageway, and said components being retained on said support member in spaced relation transversely across said passageway.

10. Apparatus as set forth in claim 9 in which, said support means includes a plurality of retaining rods releasably mounted in said chamber in traverse spaced relation across said chamber passageway, each of said retaining rods forming with said group of wire strands one of said components, said wire strands in each of said components including one end portion connected to said retaining rod and an opposite free end portion positioned downstream of said retaining rod in the direction of the gas flow, and each of said wire strands of said components extending from said retaining rod at an angle with respect to one another to form said fan pattern.

11. Apparatus as set forth in claim 10 in which, said free end portions of said wire strands of adjacently positioned components are positioned in intersecting relation to form an impact surface to receive the spray of liquid and flow of gas.

12. Apparatus as set forth in claim 9 which includes, means in contact with said field of wire strands for adjusting the density of said group of wire strands in said components to control contact of the gas with said field.

13. Apparatus as set forth in claim 1 in which, said wire strands are each connected at one end portion to said support means and extend angularly relative to one another to a free end portion, and said free end portions of said wire strands intersecting one another forming an impact surface to receive the flow of gas and liquid spray.

14. Apparatus as set forth in claim 1 in which, said wire strands extend longitudinally and laterally in said passageway to provide an extended surface for contact with the flow of gas and spray of liquid.

15. Apparatus as set forth in claim 1 in which, said passageway diverges outwardly downstream of said wire strands to accelerate the flow of gas through said chamber.

* * * * *

UNITED STATES PATENT AND TRADEMARK OFFICE
CERTIFICATE OF CORRECTION

PATENT NO.   : 5,683,476
DATED        : Nov. 4, 1997
INVENTOR(S)  : Edward F. Divers It is certified that error appears in the above-identified patent and that said Letters Patent is hereby corrected as shown below:

Column 5, line 37, delete "112" and insert --111--.

Column 5, line 40, delete "112" and insert --111--.

Signed and Sealed this

Seventh Day of September, 1999

Attest:

Q. TODD DICKINSON

Attesting Officer

Acting Commissioner of Patents and Trademarks